United States Patent [19]

Stephens

[11] Patent Number: 4,979,033
[45] Date of Patent: Dec. 18, 1990

[54] STEREOSCOPIC VIDEO SYSTEM AND METHOD WITH FIELD SYNCHRONIZATION AND INTENSITY CONTROL

[76] Inventor: Berton H. Stephens, 1024 W. Maude Ave., Suite 208, Sunnyvale, Calif. 94086

[21] Appl. No.: 249,897

[22] Filed: Sep. 27, 1988

[51] Int. Cl.$^5$ .............................................. H04N 13/00
[52] U.S. Cl. ........................................ 358/92; 358/91
[58] Field of Search .................... 358/88, 89, 91, 92, 358/139, 148, 152, 153, 167, 166, 168

[56] References Cited

U.S. PATENT DOCUMENTS

| | | | |
|---|---|---|---|
| 2,570,775 | 10/1951 | de Baun | 358/152 X |
| 2,644,887 | 7/1953 | Wolfe, Jr. | 358/150 X |
| 3,275,745 | 9/1966 | Var | 358/92 |
| 3,382,320 | 5/1968 | Baldwin et al. | 358/152 |
| 3,737,567 | 6/1973 | Kratomi | 358/92 |
| 4,145,713 | 3/1979 | White | 358/139 X |
| 4,286,286 | 8/1981 | Jurisson et al. | 358/92 |
| 4,424,529 | 1/1984 | Roese et al. | 358/92 X |
| 4,580,170 | 4/1986 | Levine | 358/167 X |
| 4,698,668 | 10/1987 | Milgram | 358/92 |

FOREIGN PATENT DOCUMENTS 0014258 1/1982 Japan .................................. 358/153

OTHER PUBLICATIONS

"Standards on Television: Methods of Testing Monochrome Television Broadcast Receivers, 1960", Swinyard et al.; IEEE, vol. 48, pp. 54 & 57; Jun. 1960.

Primary Examiner—James J. Groody
Assistant Examiner—Victor R. Kostak

[57] ABSTRACT

Stereoscopic video system and method in which left and right images are displayed during alternate fields of a video picture frame. The equalization pulses occurring during the vertical blanking interval at the outset of each field are counted to identify the field. The field identification information is utilized to synchronize the presentation of the images to the proper eyes of a viewer. Flickering of the images seen by the viewer is reduced by limiting the intensity or brightness of the displayed images to which the eyes of the viewer are exposed.

11 Claims, 3 Drawing Sheets

STEREOSCOPIC VIDEO SYSTEM AND METHOD WITH FIELD SYNCHRONIZATION AND INTENSITY CONTROL

BACKGROUND OF THE INVENTION

1. Field of the Invention

This invention pertains generally to television and other video displays and, more particularly, to a system and method for viewing video images in three dimensions.

2. Description of The Related Art

Three dimensional realism or depth perception can be added to motion picture and television presentations by providing separate left and right images of an object or scene from slightly displaced points of view and presenting these images to the respective eyes of the viewers. To be effective, it is important that left eyes receive only the left images and the right eyes receive only the right images.

In the past, one method of separating the two images involved the use of color filters in preparing the images and in viewing them. This method was used both for printed media and for film media such as the motion picture industry. The quality of images produced by this technique was limited by the quality of the filters, and only moderate image separation was possible. Another problem with this technique was that the filters attenuated all of the light passing through them to some extent, with the result that the viewed images did not have very high contrast and were not as bright as they should have been. Also, it was not possible to broadcast television images in black and white using the color filtering technique, thus limiting the technique to color transmissions only.

For motion pictures, polarizing filters have been employed to separate the images for the respective eyes. The two images are projected onto the screen simultaneously, and the viewers are provided with eyeglasses having polarized lenses which are intended to pass the left and right images to the respective eyes. This technique provides less attenuation and distortion than the color filter technique, and it has met with moderate success. It is still used occasionally.

U.S. Pat. No. 4,461,541 describes a technique in which polarizing lenses or filters are employed to provide stereoscopic images of pictures displayed on a television monitor.

U.S. Pat. No. 3,621,127 describes a three dimensional system in which the two spatially displaced images are projected onto a screen sequentially, rather than simultaneously, and viewers are provided with spectacles having mechanical shutters for alternately exposing the left and right eyes to the images. In this system, there is a problem in providing synchronization between the image source and the spectacles to insure that the proper images are presented to the respective eyes.

It is in general an object of the invention to provide a new and improved stereoscopic video system and method.

Another object of the invention is to provide a system and method of the above character which overcome the limitations and disadvantages of stereoscopic systems heretofore provided.

Another object of the invention is to provide a system and method of the above character in which presentation of the images to the proper eyes is accurately synchronized.

Another object of the invention is to provide a system and method of the above character in which brightness or intensity of the images is limited to eliminate flicker in the stereoscopic image.

SUMMARY OF THE INVENTION

These and other objects are achieved in accordance with the invention by displaying left and right images during alternate fields of a video picture frame and by counting the equalization pulses occurring during the vertical blanking interval at the outset of each field to identify the field. The field identification information is utilized to synchronize the presentation of the images to the proper eyes of a viewer. Flickering of the images seen by the viewer is reduced by limiting the intensity or brightness of the displayed images to which the eyes of the viewer are exposed.

DESCRIPTION OF THE PREFERRED EMBODIMENTS

Figure 1:
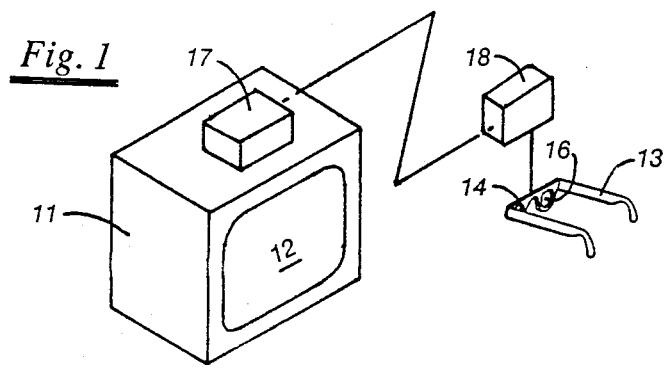
FIG. 1 is a schematic view of one embodiment of a stereoscopic video system according to the invention.

In FIG. 1, the stereoscopic video system of the invention is illustrated in connection with a television receiver or monitor 11 having a CRT display screen 12 on which a picture is scanned in raster fashion. The monitor has conventional circuitry for processing video signals from a source such as a television broadcast or a video recorder.

The system includes a pair of glasses 13 having liquid crystal lenses 14, 16 which selectively pass or block light in accordance with control voltages applied thereto. As discussed more fully hereinafter, left and right images for a stereoscopic or three dimensional presentation are displayed during alternate fields of the picture, and the glasses pass the appropriate images to the eyes of a viewer wearing them. The liquid crystal lenses are of a known design, and each includes a liquid crystal emulsion between a pair of light transmissive electrically conductive plates which are sometimes referred to as front and back planes. If out-of-phase driving signals are applied to the front and back planes, the liquid crystals are arrayed in such manner that they diffract or scatter incoming light to create an opaque condition. If the driving signals applied to the plates are in phase, the electric field aligns the liquid crystals with the light propagation axis to make the lens transmissive.

Synchronization between the operation of the glasses and the display is provided by a transmitter 17 connected to the monitor and a receiver 18 connected to the glasses. The transmission medium can be any suitable medium such as infrared, electro acoustic, radio frequency or a cable. If desired, the transmitter can be built into the monitor, and the receiver can be constructed in miniaturized, battery powered form and mounted on the frame of the glasses.

As noted above, the left and right images are displayed on the screen of the monitor during alternate fields of the picture. In the standard NTSC format, the picture is displayed at a rate of 30 frames per second, with two fields per frame and 262.5 horizontal lines per frame. The left image is displayed during the first field of each frame, and the right image is displayed during the second. In order to present the left and right images to the proper eyes, the left lens is rendered transmissive during the first field of each frame, and the right lens is rendered transmissive during the second.

Figure 4A:
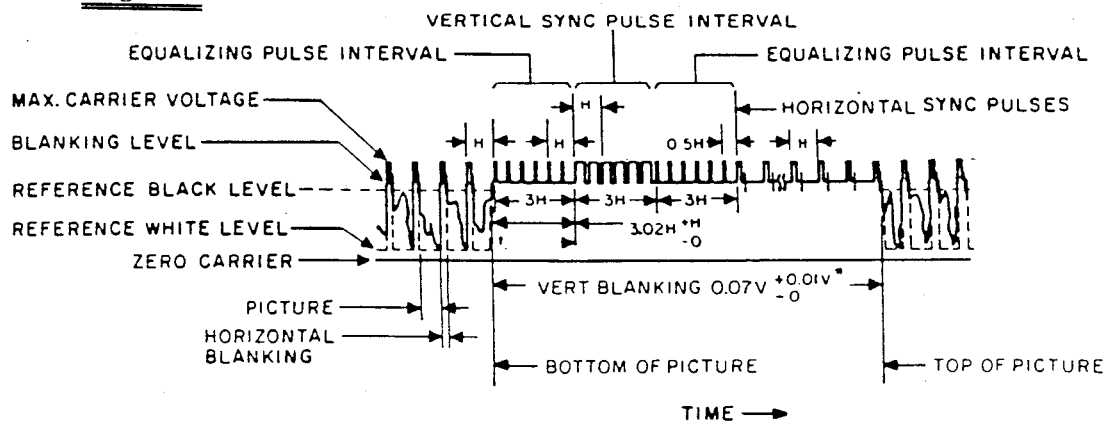
FIGS. 4a and 4b are partial waveform diagrams of a video signal in the NTSC format.
Figure 4B:
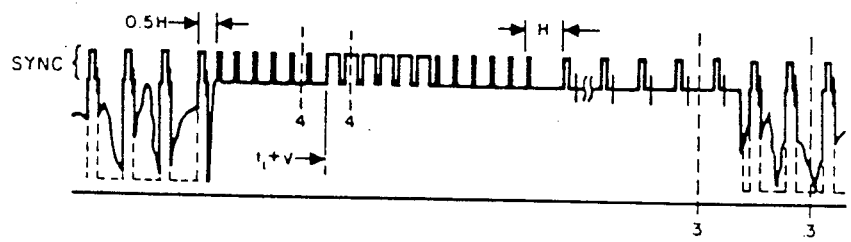

Referring now to the waveform of the NTSC video signal shown in FIG. 4, it will be noted that the vertical blanking interval between successive fields of the picture includes a first equalization pulse interval followed by a vertical sync pulse interval and a second equalization pulse interval. Each of these intervals has a duration equal to one half of the horizontal scan period. In the first field of each frame, the first equalization pulse interval has 6 negative going pulses, and the second has 7. During the second field of each frame, the first equalization pulse interval has 7 negative going pulses, and the second has 6. Thus, by monitoring the pulses during one of the equalization pulse intervals, it is possible to determine which field is being displayed. This information is utilized to control the synchronization of the glasses.

Figure 2:
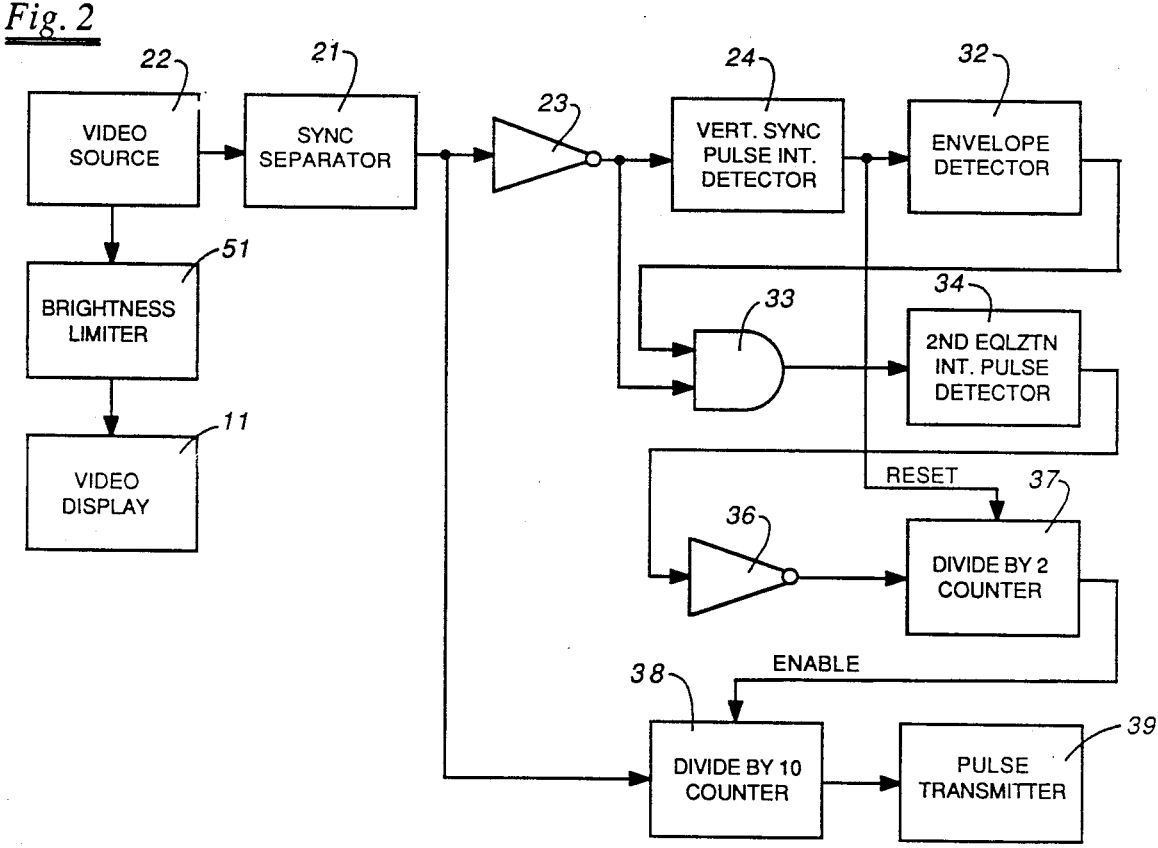
FIG. 2 is a block diagram of the transmitter section in the embodiment of FIG. 1.

As illustrated in FIG. 2, the transmitter includes a sync separator 21 which receives signals from a video source 22 such as a video recorder, the video circuits of a television receiver, or a computer. This circuit is of conventional design, and it obtains the horizontal sync pulses and the vertical blanking signals from the video signal. The output of the sync separator is connected to the input of an inverter 23.

Figure 5:
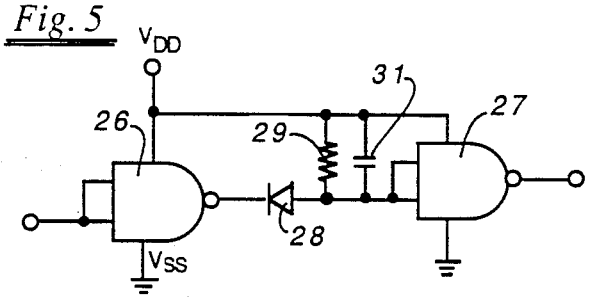
FIG. 5 is a block diagram of one embodiment of a detector circuit for use in the embodiment of FIG. 1.

The sync pulses and blanking signals from inverter 23 are applied to the input of a vertical sync pulse interval detector 24. This circuit is shown in detail in FIG. 5, and it includes a pair of NAND gates 26, 27 connected as inverters with a diode 28 connected between them. A resistor 29 and a capacitor 31 are connected between the supply voltage $V_{DD}$ and the input of inverter 27. A positive transition at the input of inverter 26 produces a negative transition at the output, which turns on diode 28 to provide a charging path for capacitor 31 through the inverter to ground. On a negative transition at the input of the inverter, the diode is cut off, and the capacitor discharges through resistor 29. The time constant of resistor 29 and capacitor 31 is greater than the vertical sync pulse interval, and the capacitor goes through charging and discharging cycles during the vertical sync pulse interval.

The output of vertical sync pulse interval detector 24 is connected to the input of an envelope detector 32 which is similar to detector 24 except it has an RC time constant such that the capacitor remains charged during the vertical sync pulse interval.

The outputs of envelope detector 32 and inverter 23 are connected to the inputs of an AND gate 33. The output of this gate is connected to the input of a detector 34 which similar to detectors 24 and 32. The input to this detector consists of the pulses from the vertical sync pulse interval and the second equalization pulse interval, and the output is the inverted pulses from the second equalization interval. This signal is restored to a positive going pulse train by an inverter 36.

The output of inverter 36 is connected to the input of a divide-by-2 counter 37, which is reset at the end of each vertical sync pulse interval by the output of vertical sync pulse interval detector 24. The counter thus counts the pulses during the second equalization pulse interval. After counting these pulses, the output of the counter remains in a logic 1 state if the interval contains an odd number of pulses, and it remains in a logic 0 state if there are an even number of pulses. Thus, during field 1, when the second equalization interval contains 7 pulses, the output of counter 37 is high, and during field 2, when the second interval contains 6 pulses, the output is low. By changing in level in accordance with the field of the picture, this signal provides positive identification of the field being displayed at any given time. This signal can be utilized as desired to control the operation of the glasses and, hence, the passage of the displayed images to the eyes of the viewer.

In the embodiment illustrated, the output of counter 37 is connected to the ENABLE input of a divide-by-10 counter 38 which counts the horizontal sync pulses and the vertical blanking pulses from sync separator 21 to provide an output signal having a suitable pulse rate for processing in a low power receiver. The output of counter 38 is applied to a pulse transmitter 39 which transmits a burst of pulses during the first field of each frame. As noted above, these pulses can be transmitted over any suitable medium such as infrared, electro acoustics, radio frequency or a cable.

Figure 3:
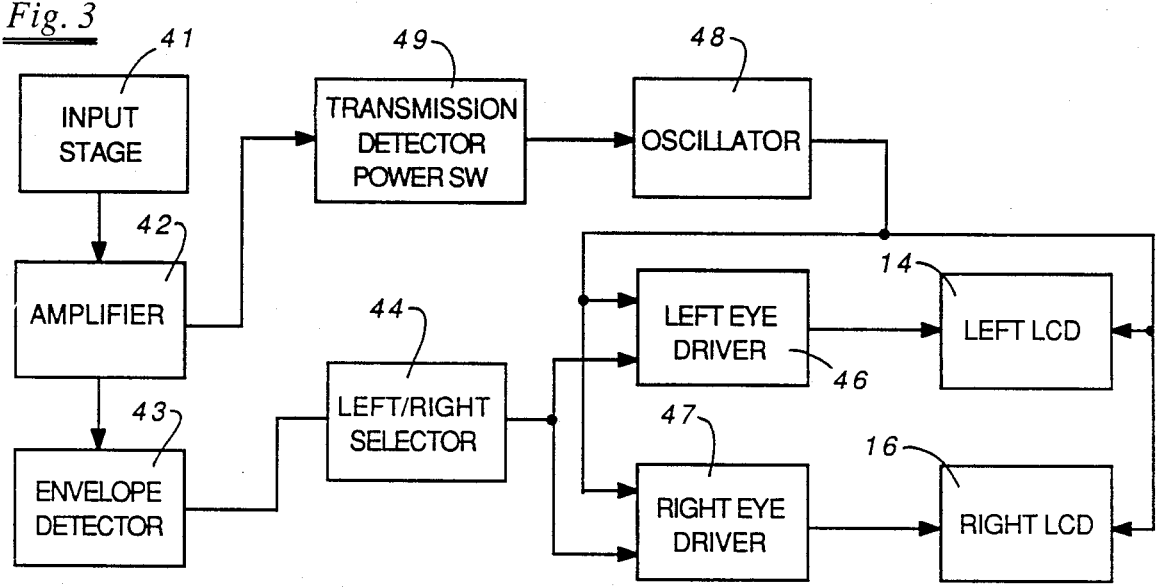
FIG. 3 is a block diagram of the receiver section in the embodiment of FIG. 1.

As illustrated in FIG. 3, receiver 18 includes an input stage 41 which includes one or more detectors for receiving the pulses from transmitter 39. The detectors and the remainder of the stage are selected in accordance with the medium employed for transmission and can be of conventional design. In one presently preferred embodiment, the detectors are directional, and they pick up the signal from transmitter 17 only when the viewer wearing the glasses is looking toward the monitor.

The pulses from input stage 41 are increased in level by an amplifier 42. The output of the amplifier is connected to the input of an envelope detector 43 which is similar to detector 24 and envelope detector 32, with a longer RC time constant to match the pulse width which is 10 times greater in the receiver than in the transmitter.

The output of envelope detector 43 is connected to the input of a left/right selector 44 which comprises another envelope detector similar to detector 43. The output of selector 44 changes in level in synchronization with the control signal from counter 37 in the transmitter, and it is connected to the inputs of drivers 46, 47 to control the application of drive signals from an oscillator 48 to the left and right liquid crystal lenses 14, 16 in glasses 13. In the embodiment illustrated, the oscillator is connected directly to the back plane of each lens, and the drivers control the phases of the signals applied to the front planes. As noted above, when the signal applied to the front plane is in phase with the signal applied to the back plane, the lens is transmissive, and when the signals are out of phase, the lens is opaque. When no signals are applied to the lenses, e.g. when the oscillator is turned off, the lenses are clear or transmissive.

A transmission detector 49 monitors the signal in amplifier 42 and turns off oscillator 48 when no signals are being received, for example when the viewer is looking away from the monitor. This permits the viewer to move about safely or to direct his attention to something else which requires unobstructed vision without having to remove the glasses. It also conserves battery power in the receiver.

Means is provided for limiting the intensity or brightness of the displayed images to which the eyes of the viewer are exposed in order to reduce or eliminate flickering of the images as perceived by the viewer. Such flickering occurs because of persistence in the human eye when exposed to bright objects. In the embodiment illustrated in FIG. 2, a brightness limiter 51 is connected between the video source and the display circuits of monitor 11 to limit the intensity or brightness of the displayed images to eliminate flicker when the images are viewed through the glasses.

Figure 6:
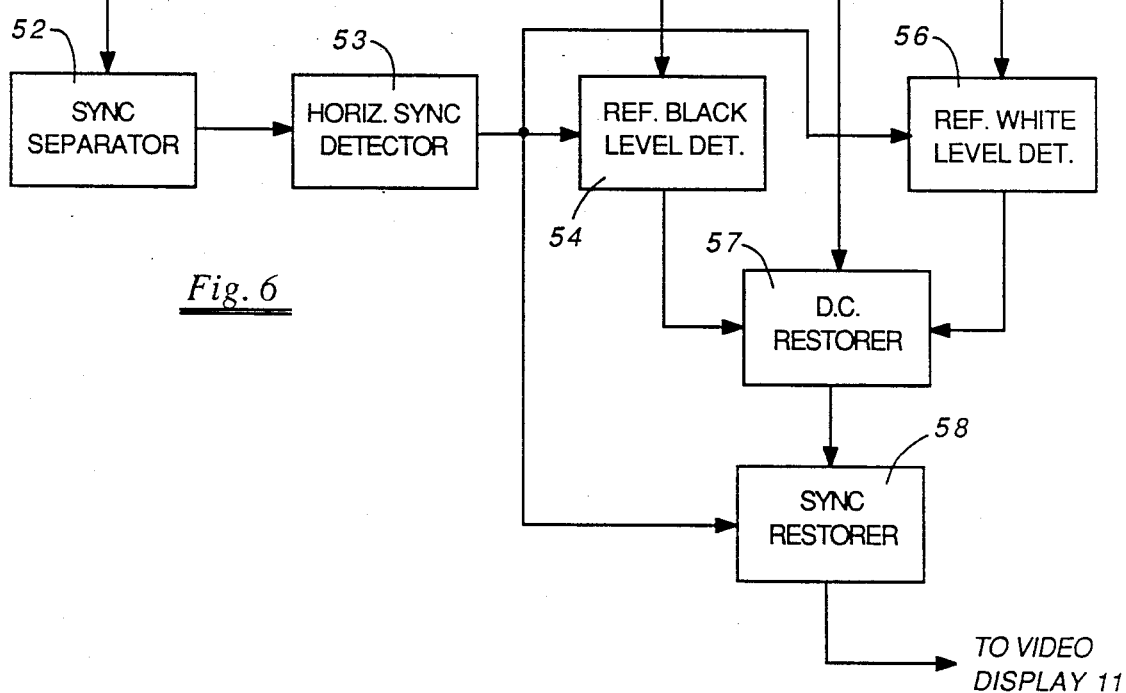
FIG. 6 is a block diagram of one embodiment of a brightness limiter for use in the embodiment of FIG. 1.

As illustrated in FIG. 6, the brightness limiter includes a sync separator 52 similar to sync separator 21. It obtains the horizontal sync pulses and vertical blanking signals from the video signal and inverts the sync phase amplitude relationships.

The output of sync separator 52 is connected to the input of a horizontal sync detector 53, and the output of detector 53 is connected to the control inputs of a reference black level detector 54 and a reference white level detector 56. The reference level detectors also receive the video signal as inputs, and they provide DC output signals corresponding to the black and white levels in the video signal.

The outputs of the black and white reference level detectors are applied to the inputs of a DC restorer 57, together with the video signal. The DC restorer sets the maximum peak brightness for the video being processed for each field as it passes through the circuit. It then compresses the brightness range on a line-by-line basis such that the peak values remain within the eye's ability to separate the images clearly, without compromising the contrast settings in the display.

The output of the DC restorer is connected to one input of a sync restorer 58, and the horizontal sync signal from sync detector 53 is applied to a second input of the sync restorer. The sync restorer reinserts the sync signals into the signal delivered to the video display.

Alternatively, the intensity or brightness to which the viewer's eyes are exposed can be limited by increasing the shuttering rate of the glasses to decrease the amount of light which the eyes receive during each field. This can, for example, be done by doubling the shuttering rate so that each eye receives two shorter exposures for each field. The increase in the shuttering rate is readily effected by doubling or otherwise increasing the rate of the control signal from envelope detector 43. The increased shuttering rate can be employed either in place of or in addition to the brightness limiting circuitry described above. When utilized by itself, the increased shuttering rate eliminates the need for the brightness limiting circuitry, and this can reduce the cost of the system.

Operation and use of the system, and therein the method of the invention, are as follows. It is assumed that the transmitter is connected to a source of video signals in the standard NTSC format and that signals for the left and right images of a stereoscopic picture are present during the first and second fields, respectively, of each frame. At the outset of each field, detectors 24, 32 and 34 and AND gate 33 separate the second equalization interval pulses from the rest of the sync and blanking pulses, and these equalization pulses are counted by counter 37. During the first field of each frame, there is an odd number of pulses, and the output of the counter is high. During the second field, there is an even number of pulses, and the output of the counter is low.

When the output of counter 37 is high, counter 38 passes the pulses from sync separator 21 to pulse transmitter, and the transmitter transmits a series of pulses which are picked up by the receiver 18. Upon receipt of these pulses, left/right selector 44 conditions drivers 46, 47 to apply in-phase signals to the front and back planes of the left liquid crystal lens 14 and out-of-phase signals to the front and back planes of the right lens. The in-phase signals render the left lens transmissive, and the displayed image is passed to the left eye. The out-of-phase signals render the right lens opaque, and the left image does not reach that eye.

During the second field of each frame, no pulses are transmitted, the in-phase signals are applied to the right lens 16, and the out-of-phase signals are applied to the left lens. During this field, the image displayed on the monitor screen is passed to the right eye and blocked from the left eye.

Flickering of the images seen by a person wearing the glasses is prevented by limiting the intensity or brightness of the images displayed on the monitor to which the eyes of the viewer are exposed in the manner discussed above.

Although the invention has been described with specific reference to a video signal in the NTSC format, it can be employed with signals in any suitable format. Likewise, while the left image has been disclosed as being displayed in the first field of each frame, the order can be reversed, if desired, with the right image being displayed in the first frame.

The invention has a number of important features and advantages. It overcomes one of the most serious problems of stereoscopic video systems heretofore provided, namely the loss of synchronization between the video display and the shuttering device for the eyes. By monitoring the equalization pulses, each field is positively identified, and proper synchronization is assured. Flicker is eliminated without perceptible loss of contrast by limiting the intensity or brightness to which the eyes of the viewer are exposed. The system can be manufactured economically, and it can be employed with existing television receivers, video recorders, computers and monitors.

It is apparent from the foregoing that a new and improved stereoscopic video system and method have been provided. While only certain presently preferred embodiments have been described in detail, as will be apparent to those familiar with the art, certain changes and modifications can be made without departing from the scope of the invention as defined by the following claims.

I claim:

1. A stereoscopic video system comprising a source of video signals for a picture having left and right images which are displayed during alternate fields with even and odd numbers of equalization pulses occurring respectively during blanking intervals at the outsets of said fields, a video display screen, means responsive to the video signals for displaying the left and right images on the screen during alternate fields of the picture, a pair of glasses with means for presenting the images on the screen alternately to the left and right eyes of a viewer, means including a divide-by-2 counter for monitoring the equalization pulses and providing a control signal which conditions the glasses to present the image on the screen to one eye in response to an even number of said pulses and to the other eye in response to an odd number of said pulses, and means for limiting the brightness of the images to which the eyes of the viewer are exposed to prevent flickering.

2. The system of claim 1 wherein the glasses have liquid crystal lenses, and means for applying driving signals to the lenses to condition them to pass and block the images.

3. The system of claim 1 including means for transmitting a signal corresponding to the control signal, a receiver associated with the glasses having a directional detector for receiving the transmitted signal when the viewer is looking toward the screen, and means responsive to the signal received by the receiver for conditioning the glasses to be light transmissive in the absence of a received signal.

4. The system of claim 1 wherein the means for limiting the brightness to which the eyes of the viewer are exposed includes means for limiting the brightness of the images displayed on the screen.

5. The system of claim 1 wherein the means for limiting the brightness to which the eyes of the viewer are exposed includes means for conditioning the glasses to alternately pass and block the images at a rate greater than the rate at which the images are displayed on the screen during alternate fields of the picture.

6. A stereoscopic video system comprising a source of video signals for a picture having left and right images which are displayed during alternate fields with even and odd numbers of equalization pulses occurring respectively during blanking intervals at the outsets of said fields, a video display screen, means responsive to the video signals for displaying the left and right images on the screen during alternate fields of the picture, a pair of glasses with means for presenting the images on the screen alternately to the left and right eyes of a viewer, and means including a divide-by-2 counter for monitoring the equalization pulses and providing a control signal which conditions the glasses to present the image on the screen to one eye in response to an even number of said pulses and to the other eye in response to an odd number of said pulses.

7. The system of claim 6 wherein the glasses have liquid crystal lenses, and means for applying driving signals to the lenses to condition them to pass and block the images.

8. The system of claim 6 including means for transmitting a signal corresponding to the control signal, a receiver associated with the glasses having a directional detector for receiving the transmitted signal when the viewer is looking toward the screen, and means responsive to the signal received by the receiver for conditioning the glasses to be light transmissive in the absence of a received signal.

9. A video system for identifying video fields in which signals are presented in a format with two fields per frame and a vertical blanking at the outset of each of the fields, and the blanking interval includes an equalization pulse interval which contains different numbers of pulses for the two fields of each frame comprising means for separating the equalization pulses from a video signal, and means including a divide-by-2 counter for counting the pulses during the equalization pulse interval and providing a field identification signal according to whether the number of pulses counted is even or odd.

10. A stereoscopic video system comprising a source of video signals for a picture having left and right images which are displayed during alternate fields, each of said fields being scanned in a plurality of horizontal lines, a video display screen, means responsive to the video signals for displaying the left and right images on the screen during alternate fields of the picture, a pair of glasses with means for presenting the images on the screen alternately to the left and right eyes of a viewer, a reference black level detector for monitoring the video signal and providing a signal corresponding to the black level of the video signal, a reference white level detector for monitoring the video signal and providing a signal corresponding to the white level of the video signal, and means responsive to the black level signal and the white level signal for compressing the brightness range for each of the horizontal lines of the picture to prevent flickering of the images as viewed through the glasses.

11. A stereoscopic video system comprising a source of video signals for a picture having left and right images which are scanned in horizontal lines and displayed during alternate fields with equalization pulses occurring during a blanking interval at the outset of each field, a video display screen, means responsive to the video signals for displaying the left and right images on the screen during alternate fields of the picture, a pair of glasses with means for presenting the images on the screen alternately to the left and right eyes of a viewer, means for monitoring the equalization pulses and providing a control signal which conditions the glasses to present the image on the screen to one eye in response to an even number of said pulses and to the other eye in response to an odd number of said pulses, a reference black level detector for monitoring the video signals and providing a signal corresponding to the black level of the video signal, a reference white level detector for monitoring the video signal and providing a signal corresponding to the white level of the video signal, and means responsive to the black level signal and the white level signal for compressing the brightness range for each of the horizontal lines of the picture to limit the brightness of the images to which the eyes of the viewer are exposed and thereby prevent flickering.

* * * * *